US012567008B2

(12) United States Patent
Dyer et al.

(10) Patent No.: US 12,567,008 B2
(45) Date of Patent: **\*Mar. 3, 2026**

(54) IDENTIFYING UNASSIGNED PASSENGERS FOR AUTONOMOUS VEHICLES

(71) Applicant: WAYMO LLC, Mountain View, CA (US)

(72) Inventors: John Wesley Dyer, Los Altos, CA (US); Luis Torres, San Francisco, CA (US); Yu-Hsin Chen, Sunnyvale, CA (US); Michael Epstein, Danville, CA (US)

(73) Assignee: Waymo LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/306,390

(22) Filed: Apr. 25, 2023

(65) Prior Publication Data

US 2023/0259836 A1      Aug. 17, 2023

Related U.S. Application Data

(63) Continuation of application No. 17/368,007, filed on Jul. 6, 2021, now Pat. No. 11,669,783, which is a (Continued)

(51) Int. Cl.
*G06Q 10/02* (2012.01)
*G01C 21/34* (2006.01)
(Continued)

(52) U.S. Cl.
CPC ......... *G06Q 10/025* (2013.01); *G01C 21/343* (2013.01); *G06Q 50/10* (2013.01); *G06Q 50/40* (2024.01)

(58) Field of Classification Search
CPC ........ G06Q 50/30; G06Q 50/40; G06Q 50/43; G06Q 50/47; G06Q 10/083; G06Q 50/50; (Continued)

(56) References Cited

U.S. PATENT DOCUMENTS 7,941,267 B2    5/2011   Adamczyk et al.
8,527,146 B1    9/2013   Jackson et al.
(Continued)

FOREIGN PATENT DOCUMENTS

CN        102194313 A      9/2011
CN        102750820 A      10/2012
(Continued)

OTHER PUBLICATIONS

D. Wang, Y. Cao, F. Yan, Y. Liu, D. Tian and Y. Zhuang, "Secure Long-Range Autonomous Valet Parking: A Reservation Scheme With Three-Factor Authentication and Key Agreement," in IEEE Transactions on Vehicular Technology, vol. 72, No. 3, pp. 3832-3847, Mar. 2023, doi: 10.1109/TVT.2022.3217371 (Year: 2023).\*
(Continued)

*Primary Examiner* — Shannon S Campbell
*Assistant Examiner* — Lisa Ma
(74) *Attorney, Agent, or Firm* — Botos Churchill IP Law

(57)          ABSTRACT

Aspects of the disclosure provide systems and methods for confirming the identity of a passenger and changing destination of a vehicle. This may include receiving dispatching instructions to pick up a first passenger at a pickup location and to drop off the first passenger at a first destination as well as authentication information for authenticating a first client computing device of the first passenger. Once the client device is authenticated and a second passenger enters the vehicle, the vehicle is maneuvered towards the first destination. While doing so, a location of the vehicle is compared to location information received from the client computing
(Continued)

devices. A notification is sent to a dispatching server based on the comparison and a second destination location is received in response. The vehicle is then maneuvered towards the second destination instead of the first destination.

24 Claims, 15 Drawing Sheets

Related U.S. Application Data continuation of application No. 15/692,458, filed on Aug. 31, 2017, now Pat. No. 11,151,482.

(51) Int. Cl.
*G06Q 50/10* (2012.01)
*G06Q 50/40* (2024.01)

(58) Field of Classification Search
CPC ...... G06Q 10/025; G06Q 50/10; H04L 12/14; H04M 3/00; H04M 15/00; H04M 17/00; H04W 4/24; G01C 21/343
USPC .......................................................... 705/6
See application file for complete search history.

(56) References Cited

U.S. PATENT DOCUMENTS

| | | | | |
|---|---|---|---|---|
| 9,613,386 | B1 | 4/2017 | Arden et al. | |
| 9,958,870 | B1 * | 5/2018 | Graybill .................... | G05D 1/02 |
| 10,482,226 | B1 | 11/2019 | Konrardy et al. | |
| 2004/0158483 | A1 | 8/2004 | Lecouturier | |
| 2012/0041675 | A1 | 2/2012 | Juliver et al. | |
| 2013/0085817 | A1 * | 4/2013 | Pinkus ............... | G06Q 30/0207 |
| | | | | 705/14.1 |
| 2014/0038640 | A1 * | 2/2014 | Wesselius ............. | H04W 4/029 |
| | | | | 455/456.1 |
| 2014/0195477 | A1 * | 7/2014 | Graumann ............ | B60W 40/08 |
| | | | | 707/737 |
| 2015/0191178 | A1 | 7/2015 | Roy et al. | |
| 2015/0210287 | A1 * | 7/2015 | Penilla .................. | B60W 40/08 |
| | | | | 701/49 |
| 2015/0339928 | A1 | 11/2015 | Ramanujam | |
| 2016/0082926 | A1 * | 3/2016 | Mouser ................... | B60R 25/01 |
| | | | | 701/2 |
| 2016/0161266 | A1 | 6/2016 | Crawford et al. | |
| 2016/0231746 | A1 | 8/2016 | Hazelton et al. | |
| 2016/0301698 | A1 * | 10/2016 | Katara ................. | H04L 63/102 |
| 2016/0332535 | A1 * | 11/2016 | Bradley ................. | G08B 21/24 |
| 2016/0349067 | A1 | 12/2016 | Fowe | |
| 2016/0368456 | A1 * | 12/2016 | Outwater .............. | B60R 25/302 |
| 2016/0370194 | A1 | 12/2016 | Colijn et al. | |
| 2017/0043783 | A1 * | 2/2017 | Shaw ................... | B60N 2/0035 |
| 2017/0080900 | A1 * | 3/2017 | Huennekens ........ | G05D 1/0088 |
| 2017/0098377 | A1 | 4/2017 | Marco et al. | |
| 2017/0153714 | A1 | 6/2017 | Gao et al. | |
| 2018/0072265 | A1 * | 3/2018 | Samadani ................ | G08G 1/20 |
| 2018/0178737 | A1 | 6/2018 | Studnicka | |
| 2019/0064806 | A1 | 2/2019 | Nix et al. | |
| 2019/0066003 | A1 | 2/2019 | Dyer et al. | |
| 2019/0286928 | A1 * | 9/2019 | Hubschman ........... | G06V 10/96 |
| 2021/0073825 | A1 * | 3/2021 | Walling ................ | G06Q 50/40 |
| 2021/0105619 | A1 * | 4/2021 | Kashani .................. | G10L 15/25 |
| 2021/0156700 | A1 * | 5/2021 | Davis ........................ | G06N 3/08 |
| 2022/0124450 | A1 * | 4/2022 | Cuddihy ............... | G06Q 50/40 |
| 2022/0222600 | A1 * | 7/2022 | Engle .............. | G06Q 10/06311 |
| 2023/0020699 | A1 * | 1/2023 | Gerrese .................. | G08B 21/24 |

FOREIGN PATENT DOCUMENTS

| | | | | |
|---|---|---|---|---|
| CN | 103021170 | A | 4/2013 | |
| CN | 104765598 | A | 7/2015 | |
| CN | 106128091 | A | 11/2016 | |
| EP | 3649026 | A2 | 5/2020 | |
| JP | 2016181156 | A | 10/2016 | |
| WO | 2014066948 | A1 | 5/2014 | |
| WO | WO-2023235338 | A1 * | 12/2023 | ............. B60N 2/002 |

OTHER PUBLICATIONS

Blumenshine, Scott. "Rideshare Drivers Request Passenger Verification to Deter Carjackings". https://www .blumenshinelawgroup. com/rideshare-drivers-request-passenger-verification-deter-carjackings/ (Year: 2021).

Extended European Search Report for Application No. EP18851919 dated Apr. 30, 2021.

Gupta, Sandeep. "DriverAuth: Behavioral biometric based driver authentication mechanism for on demand ride and ridesharing infrastructure". https://www.sciencedirect.com/science/article/pii/ S2405959517302710 (Year: 2019).

Notice of Reasons for Rejection for Japanese Patent Application No. 2020-504709, Aug. 18, 2021.

Office Action for Application No. JP2020-504709,dated Mar. 25, 2021.

The First Office Action for Chinese Patent Application No. 201880055863.5, Aug. 3, 2022.

"International Search Report and Written Opinion received for Application No. PCT/US2018/048457 dated Mar. 4, 2019", 9 pages.

* cited by examiner

110 — Computing Device(s)
120 — Processor(s)
130 — Memory
132 — Instructions
134 — Data
150 — User Input
152 — Internal Electronic Display
154 — Speakers
156 — Wireless Network Connection(s)

160 — Deceleration System
162 — Acceleration System
164 — Steering System
166 — Signaling System
168 — Navigation System
170 — Positioning System
172 — Perception System
174 — Power System (Engine)

100

200

304
306
305
312
310

314

308
303
308
307
306
302
312
310

314

400

610

X5,Y6

T6

X5,Y5

T5

X4,Y4

T4

X3,Y3

T3

T2

X2,Y2

X1,Y1

T1

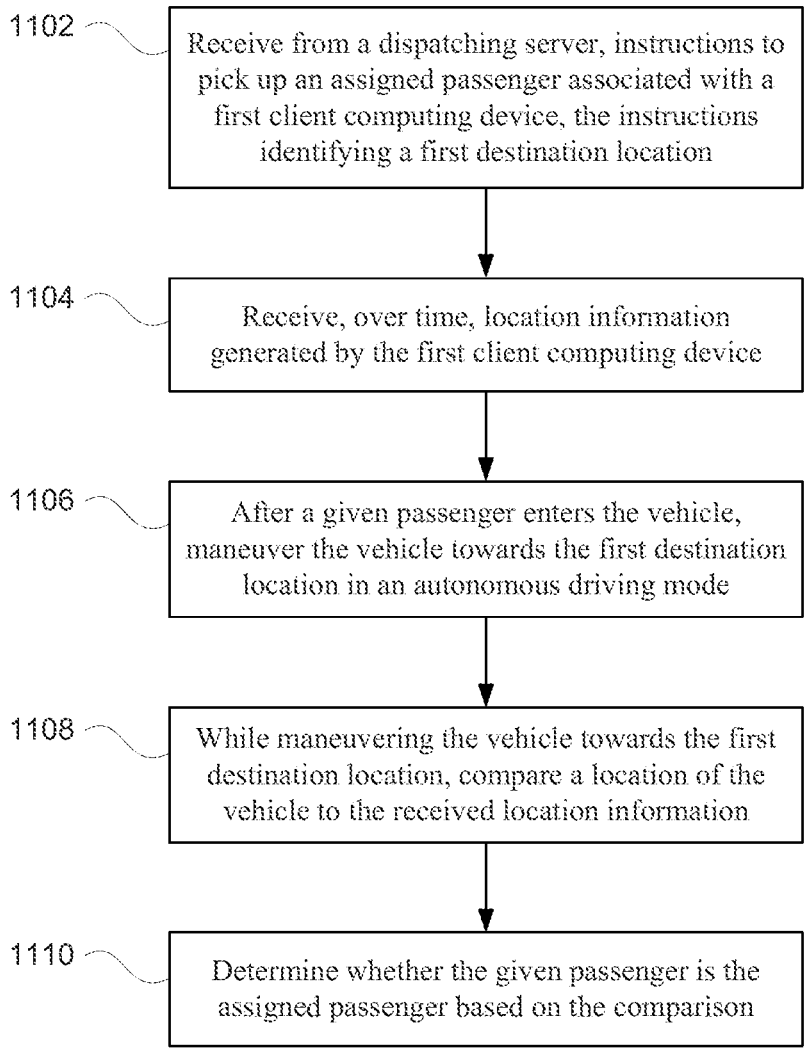

1102 — Receive from a dispatching server, instructions to pick up an assigned passenger associated with a first client computing device, the instructions identifying a first destination location 1104 — Receive, over time, location information generated by the first client computing device 1106 — After a given passenger enters the vehicle, maneuver the vehicle towards the first destination location in an autonomous driving mode 1108 — While maneuvering the vehicle towards the first destination location, compare a location of the vehicle to the received location information 1110 — Determine whether the given passenger is the assigned passenger based on the comparison

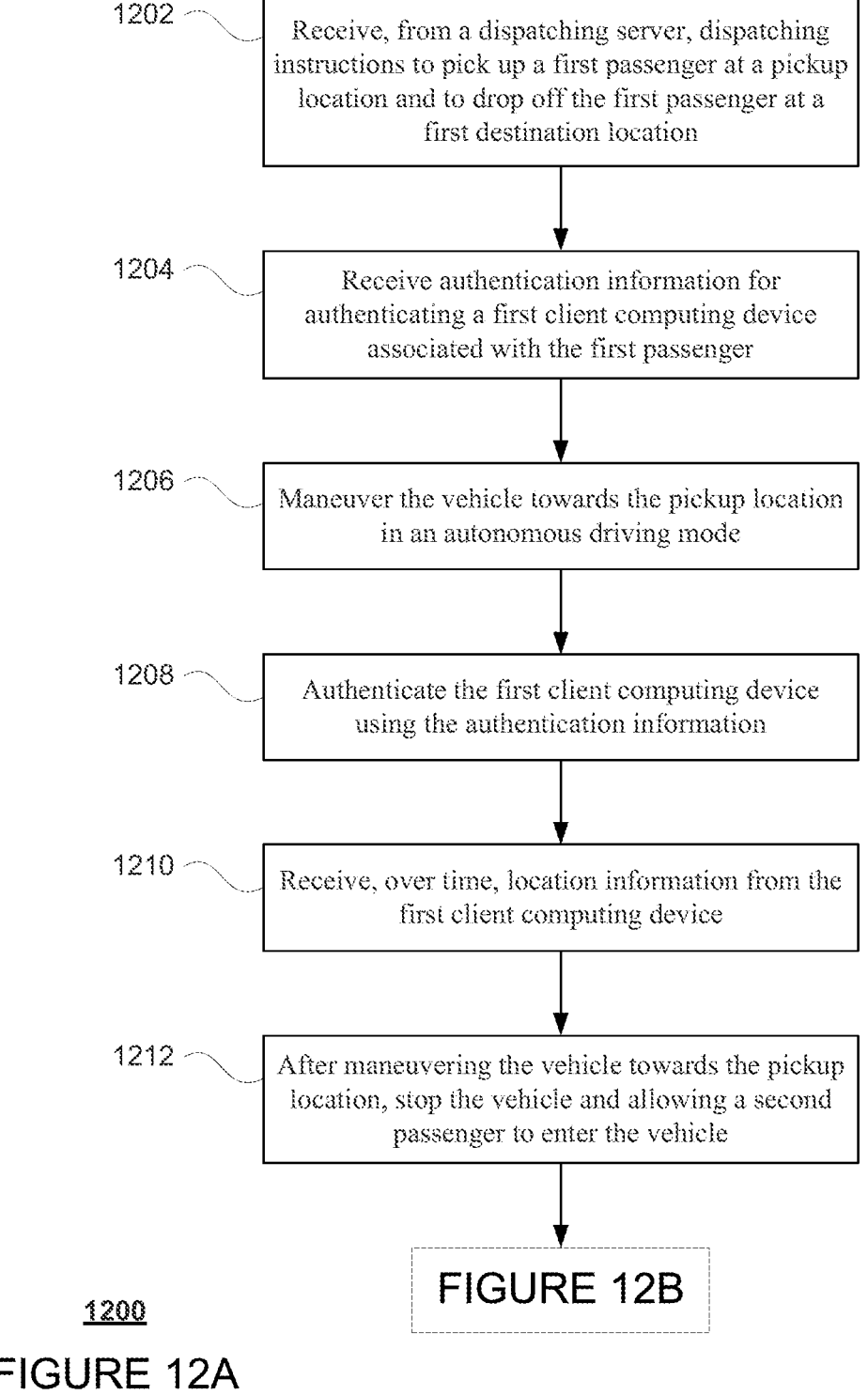

1202 — Receive, from a dispatching server, dispatching instructions to pick up a first passenger at a pickup location and to drop off the first passenger at a first destination location 1204 — Receive authentication information for authenticating a first client computing device associated with the first passenger 1206 — Maneuver the vehicle towards the pickup location in an autonomous driving mode 1208 — Authenticate the first client computing device using the authentication information 1210 — Receive, over time, location information from the first client computing device 1212 — After maneuvering the vehicle towards the pickup location, stop the vehicle and allowing a second passenger to enter the vehicle

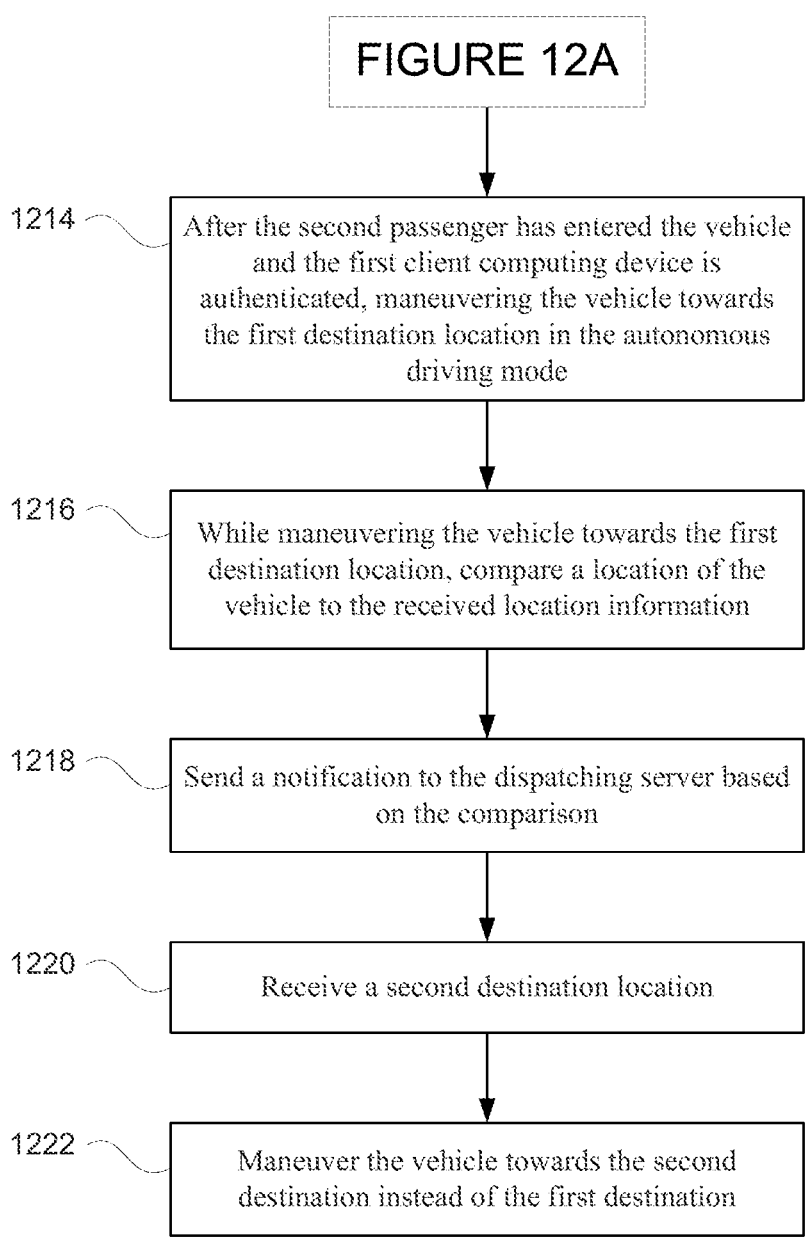

FIGURE 12A

1214 — After the second passenger has entered the vehicle and the first client computing device is authenticated, maneuvering the vehicle towards the first destination location in the autonomous driving mode 1216 — While maneuvering the vehicle towards the first destination location, compare a location of the vehicle to the received location information 1218 — Send a notification to the dispatching server based on the comparison 1220 — Receive a second destination location 1222 — Maneuver the vehicle towards the second destination instead of the first destination

IDENTIFYING UNASSIGNED PASSENGERS FOR AUTONOMOUS VEHICLES

CROSS REFERENCE TO RELATED APPLICATIONS

The present application is a continuation of U.S. patent application Ser. No. 17/368,007, filed Jul. 6, 2021, which is a continuation of U.S. patent application Ser. No. 15/692, 458, filed Aug. 31, 2017, now U.S. Pat. No. 11,151,482, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. In some cases, a person may inadvertently enter the wrong vehicle. When there is a human driver, he or she may quickly communicate with that person in order to confirm that the person is in the correct vehicle, for instance by confirming the passenger's destination. However, in some instances, the person may inadvertently confirm incorrect information. Correcting such mistakes in the case of autonomous vehicles which do not have a human driver can be particularly difficult.

BRIEF SUMMARY

One aspect of the disclosure provides a method of identifying a passenger of a vehicle. The method includes receiving, by one or more processors, from a dispatching server, instructions to pick up an assigned passenger associated with a first client computing device, the instructions identifying a first destination location; receiving, by the one or more processors over time, location information generated by the first client computing device; after a given passenger enters the vehicle, maneuvering, by the one or more processors, the vehicle towards the first destination location in an autonomous driving mode; while maneuvering the vehicle towards the first destination location, comparing, by the one or more processors, a location of the vehicle to the received location information; and determining whether the given passenger is the assigned passenger based on the comparison.

In one example, the method also includes, when the given passenger is determined not to be the assigned passenger, sending, by the one or more processors, a notification to the dispatching server indicating that the given passenger is determined not to be the assigned passenger; receiving, by the one or more processors, a second destination location; and maneuvering, by the one or more processors, the vehicle in the autonomous driving mode towards the second destination location instead of the first destination location. In this example, the notification requests authentication information for the second passenger. In addition or alternatively, the method also includes, before maneuvering the vehicle towards the second destination, in response to sending the notification, receiving second authentication information for authenticating a second client computing device, and using the second authentication information to authenticate the second client computing device associated with the second passenger. In addition or alternatively, the method also includes, before maneuvering the vehicle towards the first destination location, displaying a request for a passenger within the vehicle to confirm the first destination location. In addition or alternatively, the method also includes while maneuvering the vehicle towards the first destination location, using one or more transceivers of the vehicle to communicate with a second client computing device in the vehicle, and receiving via the transceiver, a response from the second client computing device, and wherein sending the notification is further based on the response received from the second client computing device.

In another example, the method also includes comparing changes in the received location information over time with changes in the location of the vehicle over time and wherein determining whether the given passenger is the assigned passenger is further based on the comparison of changes in the received location information over time with changes in the location of the vehicle over time. In another example, the method also includes, estimating a speed of the first client computing device based on the received location information and comparing a speed of the vehicle with the estimated speed, and wherein determining whether the first passenger is the assigned passenger is further based on the comparison of the speed of the vehicle with the estimated speed. In another example, the method also includes estimating a heading of the first client computing device based on the received location information, and comparing a heading of the vehicle with the estimated heading, and determining whether the first passenger is the assigned passenger is further based on the comparison of the heading of the vehicle with the estimated heading. In another example, the method also includes receiving, by the one or more processors from the dispatching server, authentication information for authenticating the first client computing device associated with the first passenger, and prior to the first passenger entering the vehicle, authenticating, by the one or more processors, the first client computing device using the authentication information.

Another aspect of the disclosure provides a system for changing a destination of a driverless vehicle. The system includes one or more processors configured to receive from a dispatching server, instructions to pick up an assigned passenger associated with a first client computing device, the instructions identifying a first destination location; receive, over time, location information generated by the first client computing device; after a given passenger enters the vehicle, maneuver the vehicle towards the first destination location in an autonomous driving mode; while maneuvering the vehicle towards the first destination location, compare a location of the vehicle to the received location information; and determine whether the given passenger is the assigned passenger based on the comparison.

In one example, the one or more processors are further configured to when the given passenger is determined not to be the assigned passenger, send a notification to the dispatching server indicating that the given passenger is determined not to be the assigned passenger; receive a second destination location; and maneuver the vehicle in the autonomous driving mode towards the second destination location instead of the first destination location. In this example, the notification requests authentication information for the second passenger. In addition or alternatively, the one or more processors are further configured to, before maneuvering the vehicle towards the second destination, in response to sending the notification, receive second authentication information for authenticating a second client computing device, and use the second authentication information to authenticate the second client computing device associated with the second passenger. In addition or alternatively, the one or more processors are further configured to, while maneuvering the vehicle towards the first destination location, use one or more transceivers of the vehicle to communicate with a second client computing device in the vehicle and receive via the transceiver, a response from the second client computing device, and sending the notification is further based on the response received from the second client computing device.

In another example, the one or more processors are further configured to compare changes in the received location information over time with changes in the location of the vehicle over time and to determine whether the given passenger is the assigned passenger is further based on the comparison of changes in the received location information over time with changes in the location of the vehicle over time. In another example, the one or more processors are further configured to estimate a speed of the first client computing device based on the received location information and compare a speed of the vehicle with the estimated speed, and determining whether the first passenger is the assigned passenger is further based on the comparison of the speed of the vehicle with the estimated speed. In another example, the one or more processors are further configured to estimate a heading of the first client computing device based on the received location information and compare a heading of the vehicle with the estimated heading, wherein determining whether the first passenger is the assigned passenger is further based on the comparison of the heading of the vehicle with the estimated heading. In another example, the one or more processors are further configured to receive, from the dispatching server, authentication information for authenticating the first client computing device associated with the first passenger and prior to the first passenger entering the vehicle, authenticate the first client computing device using the authentication information. In another example, the system also includes the vehicle.

BRIEF DESCRIPTION OF THE DRAWINGS

FIG. 11 is a flow diagram in accordance with aspects of the disclosure.

FIGS. 12A and 12B are another flow diagram in accordance with aspects of the disclosure.

DETAILED DESCRIPTION

Overview

Figure 1:
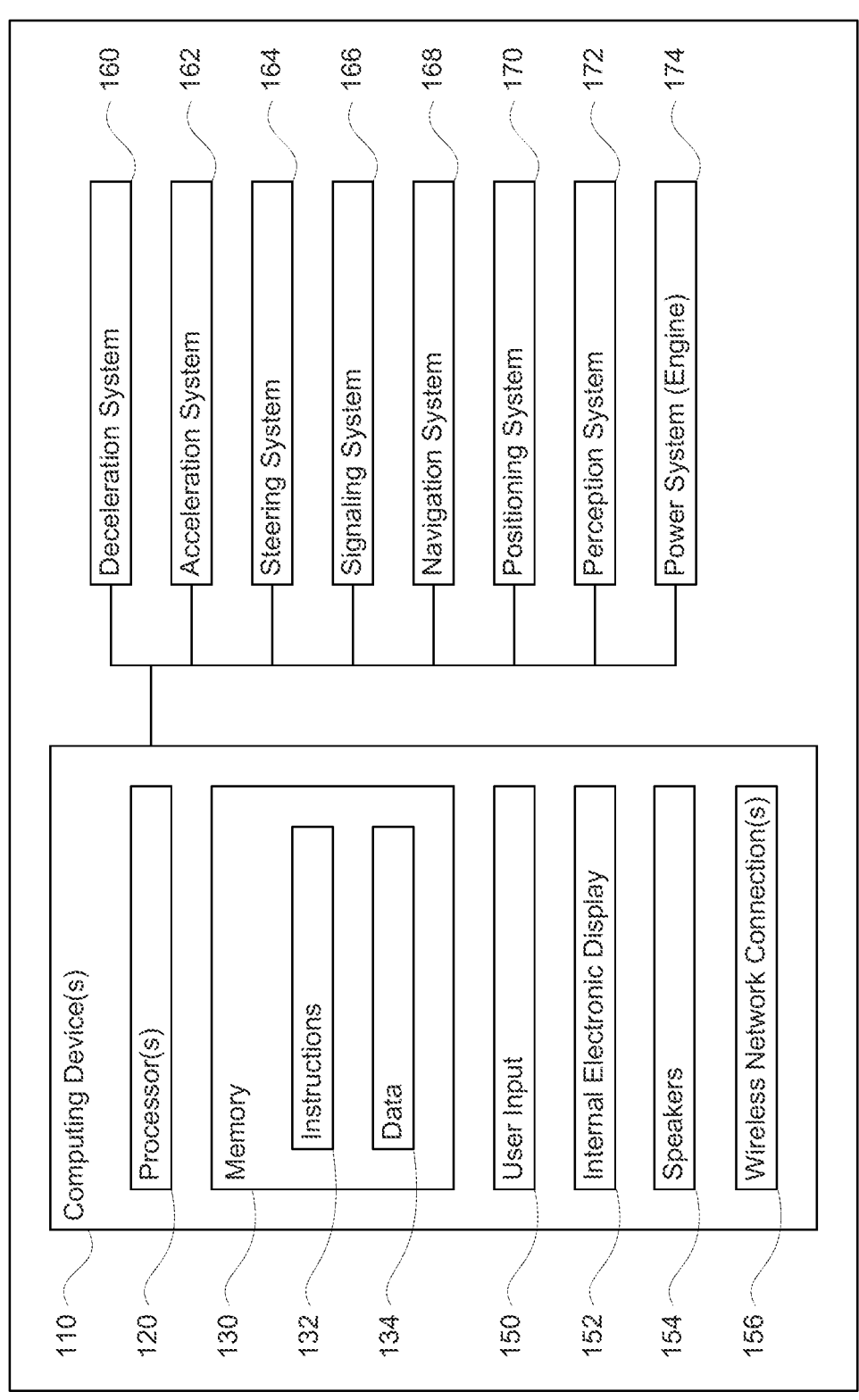
FIG. 1 is a functional diagram of an example vehicle in accordance with aspects of the disclosure.

As noted above, passenger pickup and drop off for self-driving vehicles can be challenging due to the difficulties involved in communicating information between people and the computing devices that control these vehicles. Moreover, in situations where there are multiple passengers waiting to be picked up by multiple vehicles, it can be difficult for those passengers to recognize their vehicle and for the computing devices of the vehicle to recognize an assigned passengers. In addition, people can make mistakes, for instance, sometimes entering a vehicle assigned to another passenger. Even with precautions, such as asking the passenger to confirm their destination once in the vehicle can fail given the tendency for people entering a vehicle to be in a rush to get where they were going and act impulsively. Thus, while it is important to be able to ensure that the assigned passenger enters the correct vehicle, the issue can become a challenge to address once a different passenger has entered the wrong vehicle by mistake.

Typically, a passenger would use his or her client computing device (for instance, mobile phone) to request a vehicle using an application on the client computing device. The request may include a pickup location as well as a destination location. In response, a central dispatching service or server would dispatch a vehicle to pick up that passenger at the pickup location. Once the vehicle is within a certain distance of that pickup location, the computing devices may look for an appropriate place to stop and allow the passenger to enter the vehicle. This pickup may also involve authenticating a client device of the passenger. Once the passenger enters, the computing devices may begin to maneuver the vehicle towards the destination.

Of course, once a passenger enters the vehicle, especially in situations where there are multiple passengers waiting for such vehicles in the same area (such as a train station, movie theater, airport, mall, etc.), the computing devices must determine whether the passenger who enters the vehicle is the passenger who was actually assigned to the vehicle. In order to do so, the vehicle's computing devices may use information from the client computing device of the passenger within the vehicle as well as that of the assigned passenger to determine whether the assigned passenger is actually within the vehicle. For instance, once the authentication of the assigned passenger's client computing device has taken place (typically before the passenger enters the vehicle), the assigned passenger's client computing device may begin sharing location information, such as GPS coordinates or other location coordinates, with the vehicle. Once the vehicle begins moving, the computing devices may confirm that the GPS coordinates and/or the change in the GPS coordinates over time is consistent with the location and movement of the vehicle over time. If so, this may confirm that the assigned passenger is in the vehicle. If not, this may indicate that the wrong passenger has entered the vehicle.

If the passenger within the vehicle is the assigned passenger, then the computing devices may continue moving the vehicle towards the destination. If the passenger within the vehicle is not the assigned passenger, the vehicle's computing devices may attempt to determine who is in the vehicle. This may involve attempting to communicate with a client computing device within the vehicle (i.e., one associated with the new passenger who is in the vehicle) in order to obtain sufficient information to authenticate the client computing device within the vehicle and/or request an updated destination from the dispatching server computing device. The dispatching server computing device may then reassign the vehicle to the new passenger and send authentication information to the vehicle's computing devices. In this regard, once the client computing device within the vehicle is authenticated, the computing devices may identify the passenger's actual destination and change the vehicle's destination from that of the previously assigned passenger to that of the newly assigned passenger.

The features described herein, may allow computing devices of an autonomous vehicle to quickly and easily confirm that a passenger who enters a vehicle was actually assigned to that vehicle without causing any additional delay to the passenger (if indeed it is the assigned passenger). In addition, these features allow the vehicle's computing devices to reroute the vehicle to a new destination in a way that reduces inconvenience (and in some cases embarrassment) to the passenger in the vehicle. By allowing the vehicle to change destinations and inform the passenger why, this may even provide the passenger with a greater sense of safety when using the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having a heading that is oriented at an angle that is 30 to 60 degrees offset from a current path of the vehicle" In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 2:
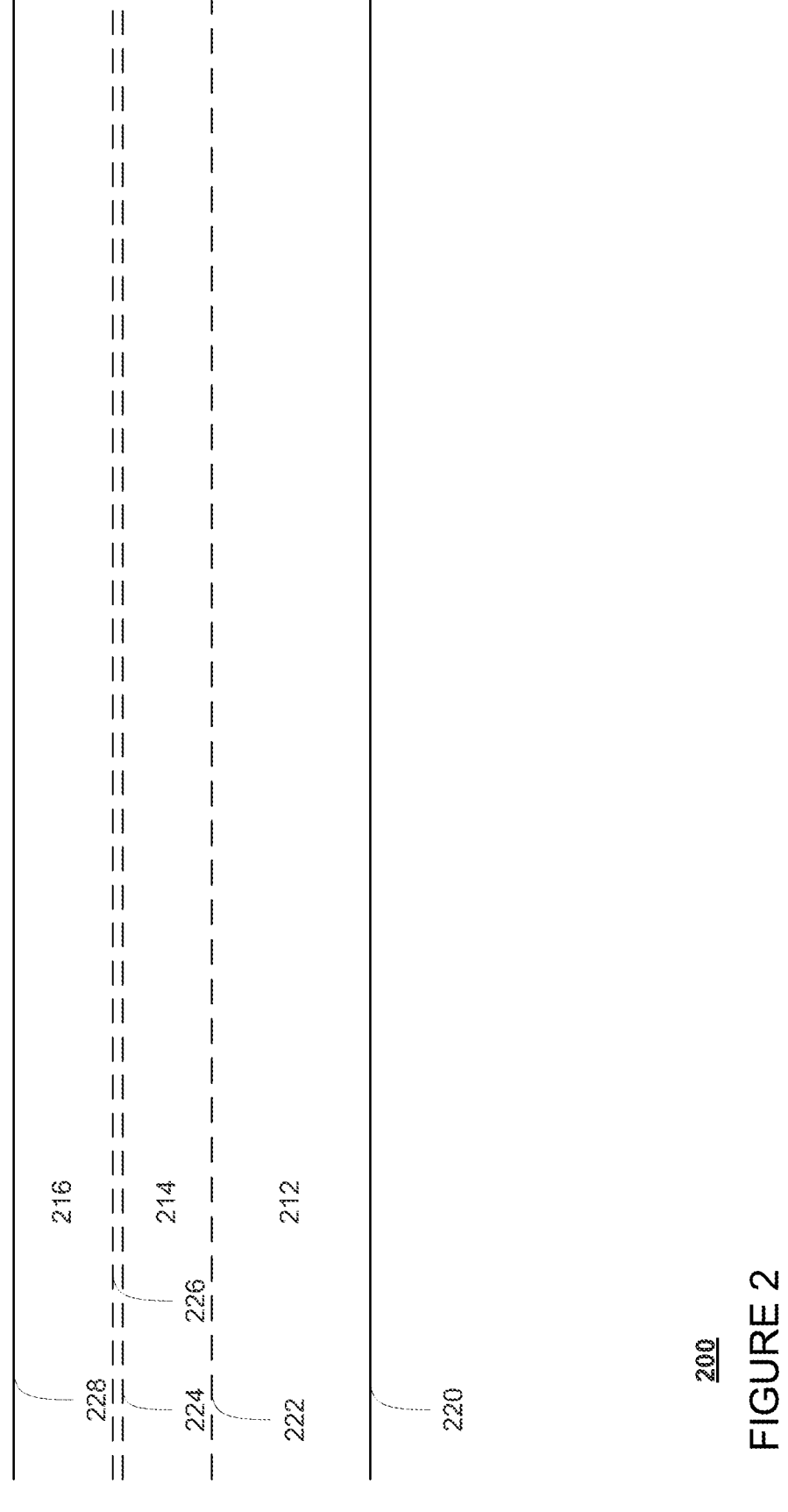
FIG. 2 is an example representation of detailed map information in accordance with aspects of the disclosure.
Figure 3A:
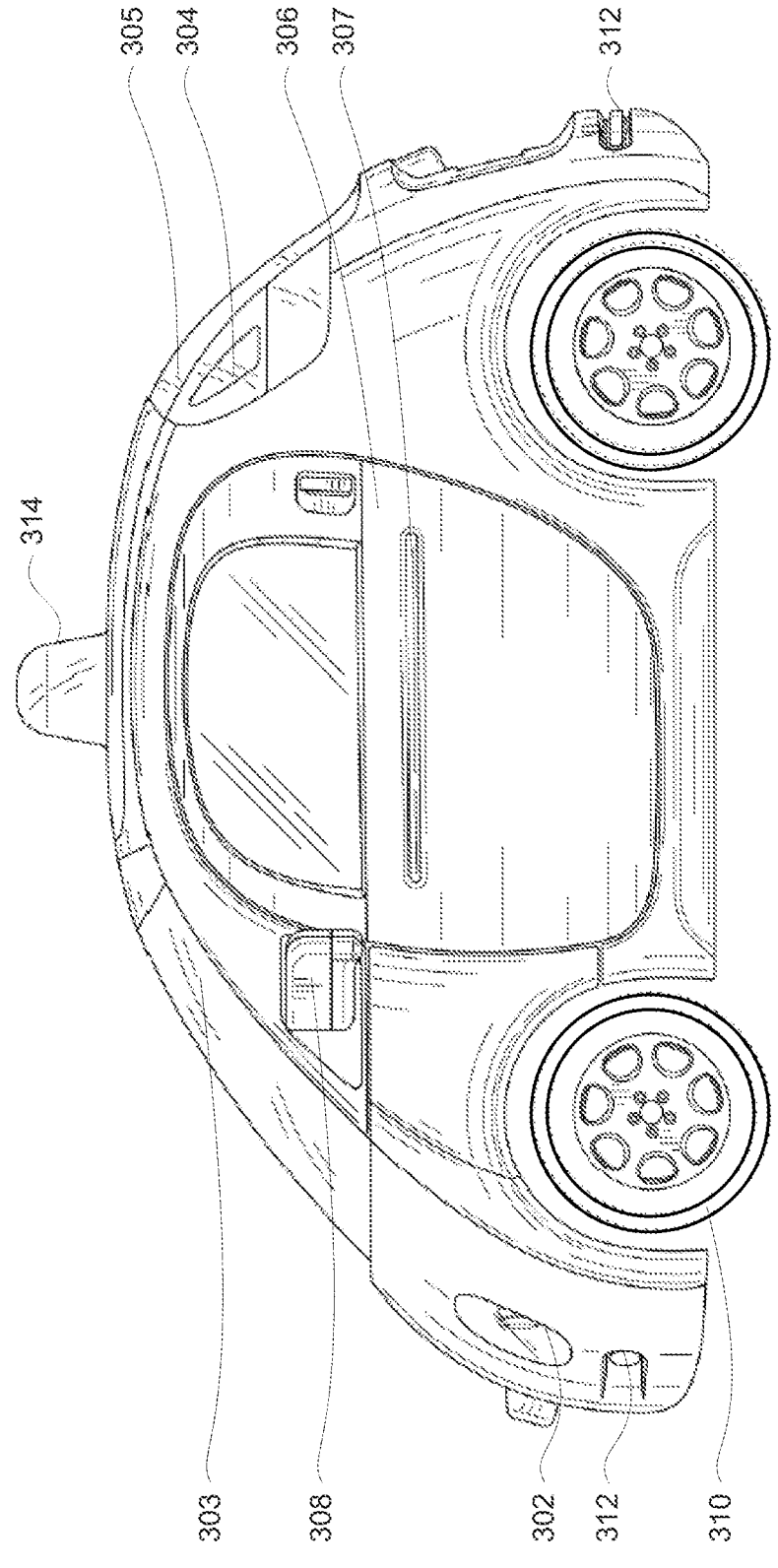
FIGS. 3A-3D are example external views of a vehicle in accordance with aspects of the disclosure.
Figures 3B, 3C:
Figure 3D:
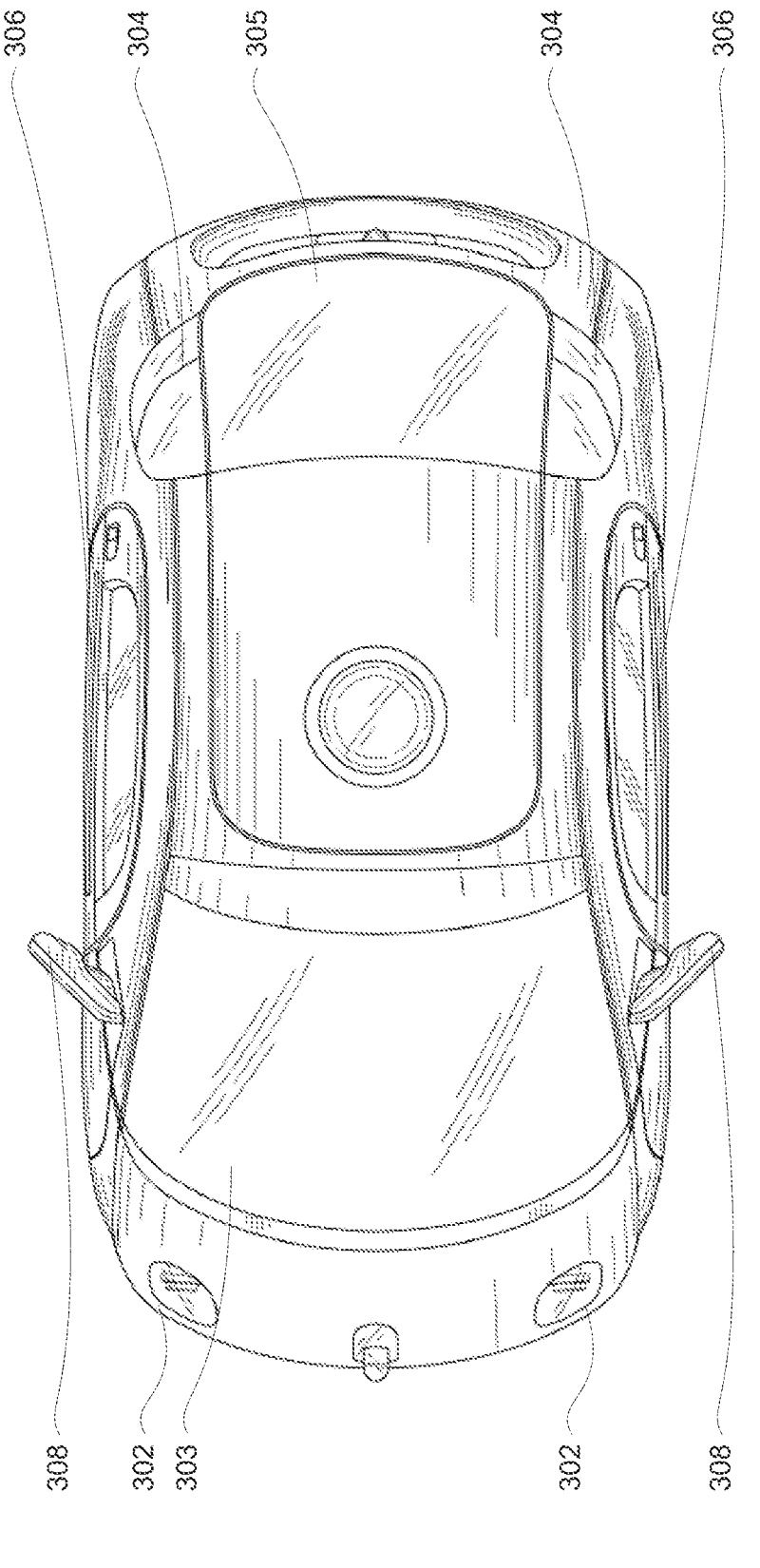

FIG. 2 is an example of map information 200 for a section of roadway. The map information 200 includes information identifying the shape, location, and other characteristics of various road features. In this example, the map information includes three lanes 212, 214, 216 bounded by curb 220, lane lines 222, 224, 226, and curb 228. Lanes 212 and 214 have the same direction of traffic flow (in an eastward direction), while lane 216 has a different traffic flow (in a westward direction). In addition, lane 212 is significantly wider than lane 214, for instance to allow for vehicles to park adjacent to curb 220. Although the example of map information includes only a few road features, for instance, curbs, lane lines, and lanes, given the nature of the roadway, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more road-graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Figure 4:
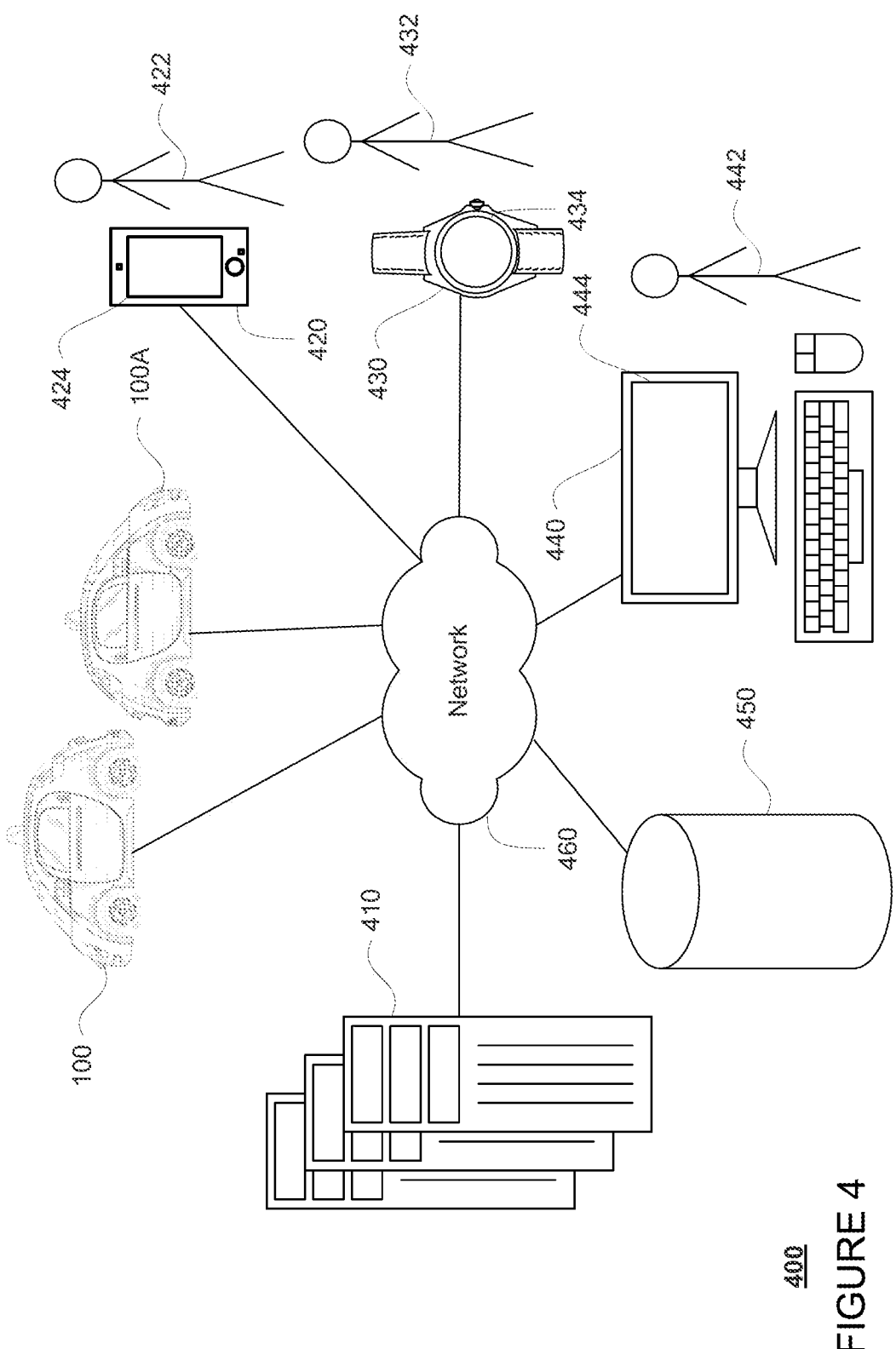
FIG. 4 is an example pictorial diagram of a system in accordance with aspects of the disclosure.
Figure 5:
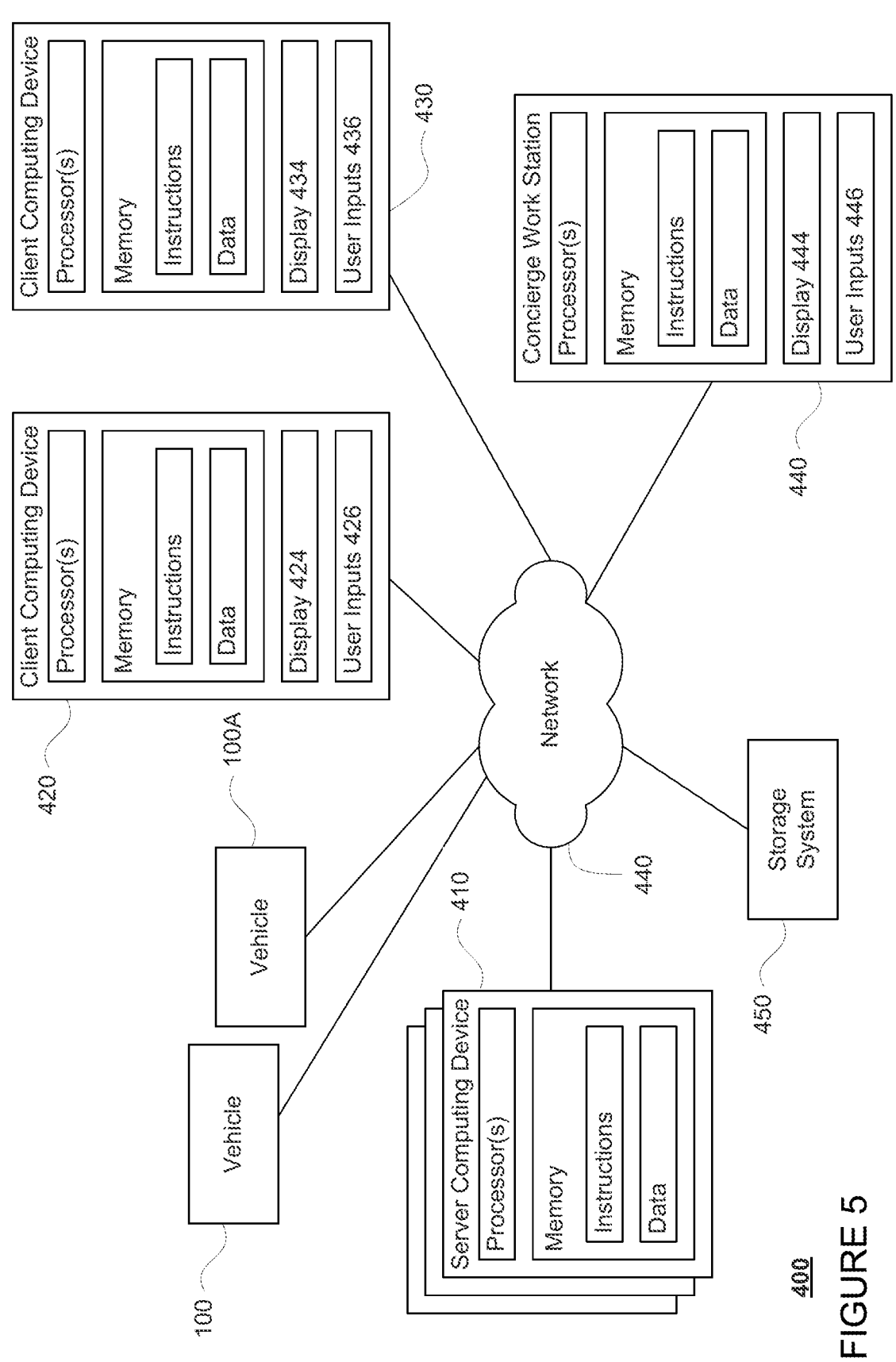
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. As an example, a pickup location can be defaulted to the current location of the user's client computing device, or can be input by the user at the user's client device. For instance, the user may enter an address or other location information or select a location on a map to select a pickup location.

Once the user has selected one or more of a pickup and/or destination locations, the client computing device 420 may send the location or locations to one or more server computing devices of the centralized dispatching system. In response, one or more server computing devices, such as server computing device 410, may select a vehicle, such as vehicle 100, for instance based on availability and proximity to the user. The server computing device 410 may then assign the user as the passenger for the vehicle 100, dispatch the selected vehicle (here vehicle 100) to pick up to the assigned passenger. This may include by providing the vehicle's computing devices 110 with the pickup and/or destination locations specified by the assigned passenger as well as information that can be used by the computing devices 110 of vehicle 100 to authenticate the client computing device, such as client computing device 430.

Figure 6:
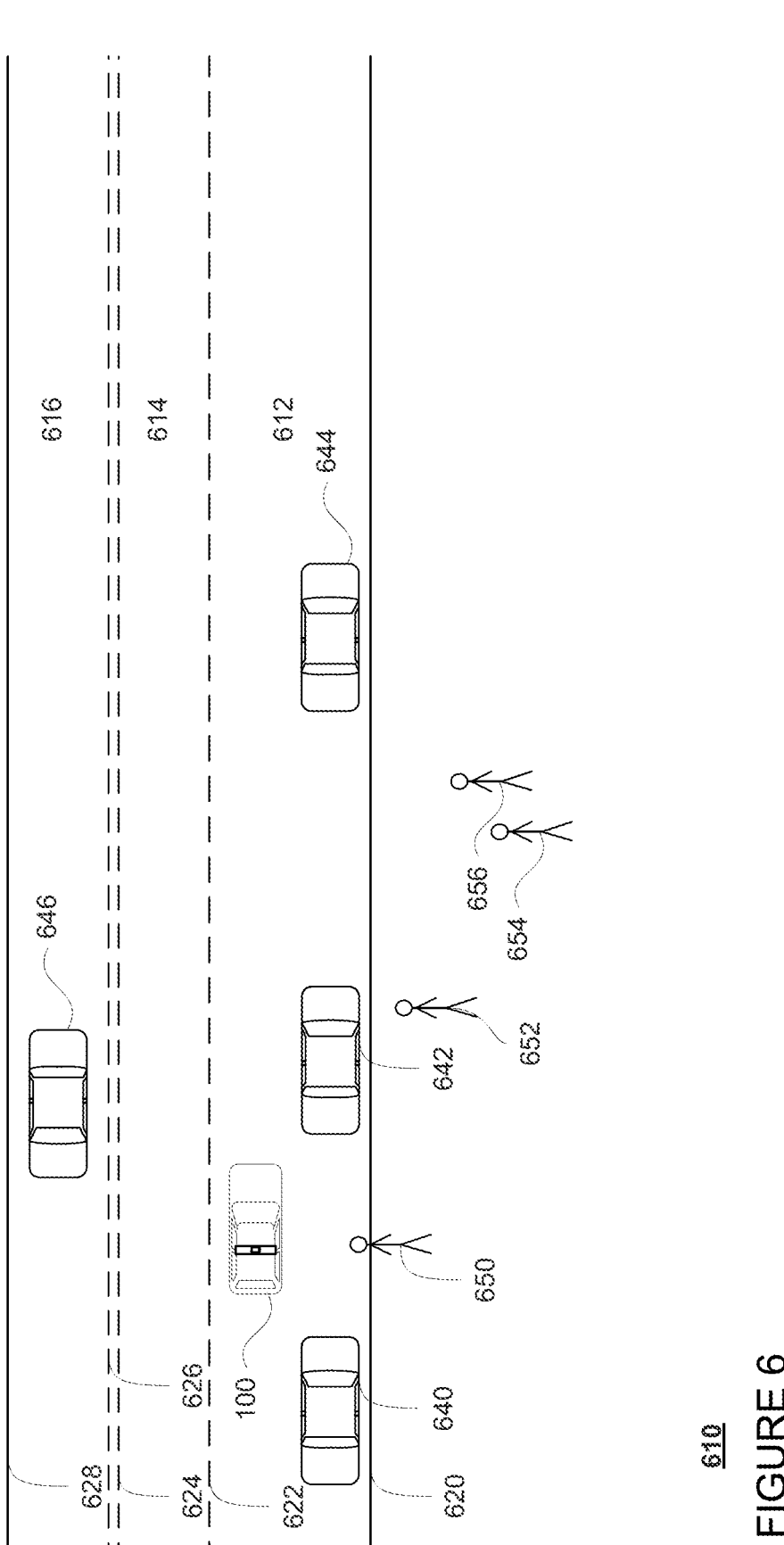
FIG. 6 is a view of a section of roadway in accordance with aspects of the disclosure.

FIG. 6 is an example view of vehicle 100 driving along a roadway 610 corresponding to roadway 210 of FIG. 2. In that regard, lanes 612, 614, 616 correspond to the shape and location of lanes 212, 214, 216, curbs 620, 628 correspond to the shape and location of curb 220, and lane lines 622, 624, 626 correspond to the shape and location of lane lines 222, 224, 226, and curb 228. In this example, vehicle 100 is traveling in lane 612. Vehicles 640, 642, and 644 are parked within lane 612 along curb 620, while vehicle 646 is moving in lane 616. Pedestrians 650, 652, 654, 656 are located around roadway 210, but within the range of the sensors of the perception system 172.

Figure 7:
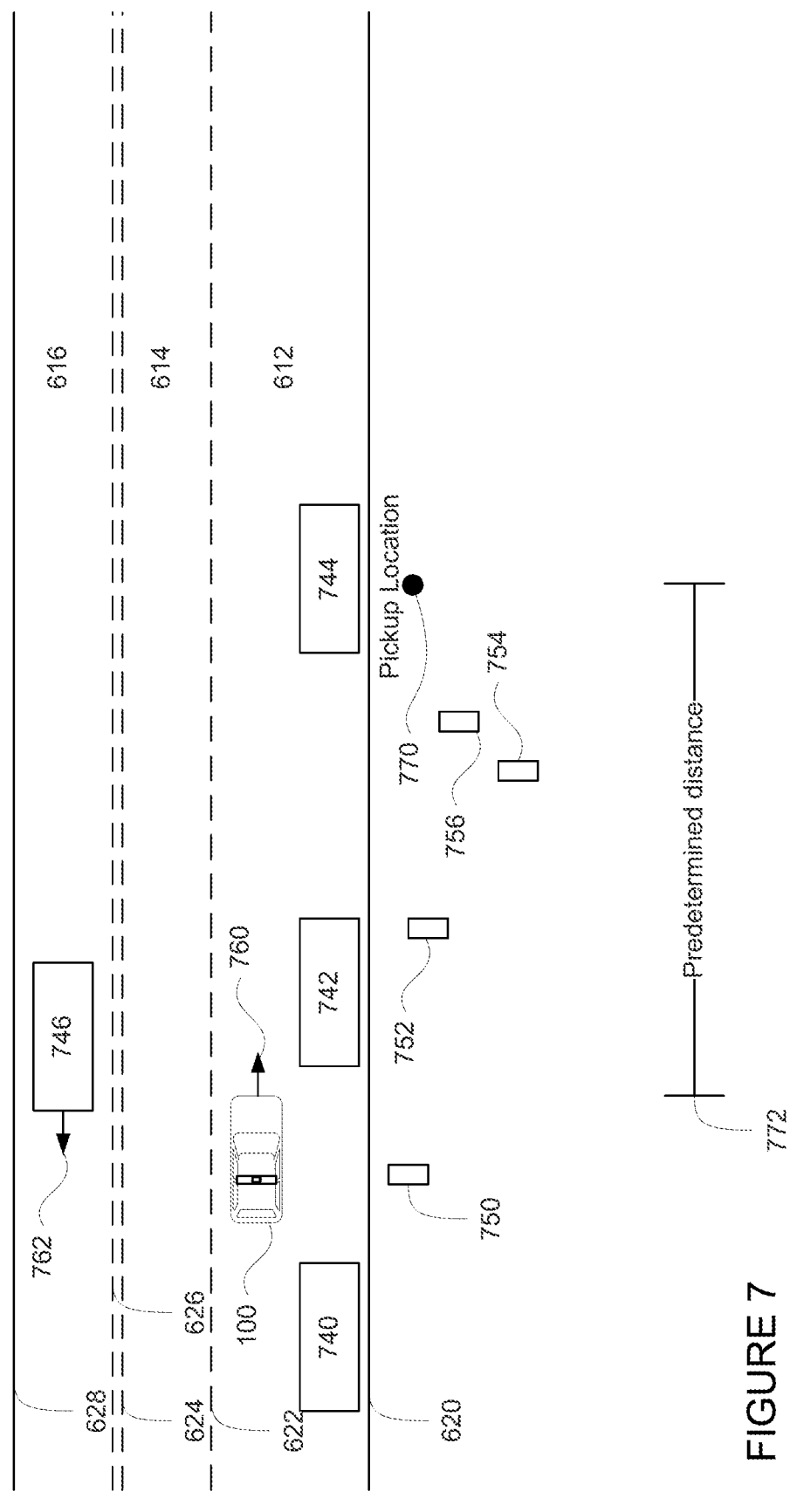
FIG. 7 is an example of sensor data for the section of roadway and other information in accordance with aspects of the disclosure.

As the vehicle moves along lane 612, the perception system 172 provides the computing devices with sensor data regarding the shapes and location of objects, such as curbs 620, 628, lane lines 622, 624, 624, as well as vehicles 640, 642, 644, 646. FIG. 7 depicts sensor data perceived by the various sensors of the perception system 172 when vehicle 100 is in the situation as depicted in FIG. 6 in combination with other information available to the computing devices 110. In this example, vehicles 640, 642, 644, 646, are represented by bounding boxes 740, 742, 744, 746 as provided by the perception system 172 to the computing devices 110. Pedestrians 650, 652, 654, 656 are also represented by bounding boxes 750, 752, 754, 756, of course the boundaries of objects such as pedestrians. Of course, these bounding boxes represent merely a volume of space within which data points corresponding to an object are at least approximately bounded within. In addition, the actual heading of vehicle 100 and estimated heading of bounding box 746 are represented by arrows 760 and 762, respectively. As bounding boxes 740, 742, 744 appear to be moving very slowly or not at all, the computing devices 110 may determine that the objects represented by these bounding boxes are parked along curb 620.

Once the vehicle is within a predetermined distance in time or space from the pickup location, such as sometime before or after the vehicle's computing devices should begin looking for a place to stop and/or park the vehicle and an assigned passenger's client devices has been authenticated by the vehicle. As an example, this distance may be 50 meters, 50 feet, or more or less from the pickup location. For instance, using near-field communication, BLUETOOTH® or other wireless protocols, the computing devices may attempt to communicate and establish a link with the client device. When this link is successfully established, the client device can be authenticated.

For instance, returning to FIG. 7, vehicle 100 has just reached the predetermined distance 772 from pickup location 770. At this point, vehicle 100 will attempt to authenticate the client computing device of the assigned passenger using the information received from the server computing devices 410. In this regard, the computing devices 110 and 430 may create a direct communication link and therefore be capable of direct communication of information (i.e. without the need for the information to be relayed by the server computing devices 410). As an example, the client computing device may begin to send location information, such as GPS coordinates or other location coordinates, to the computing devices 110.

Figure 8:
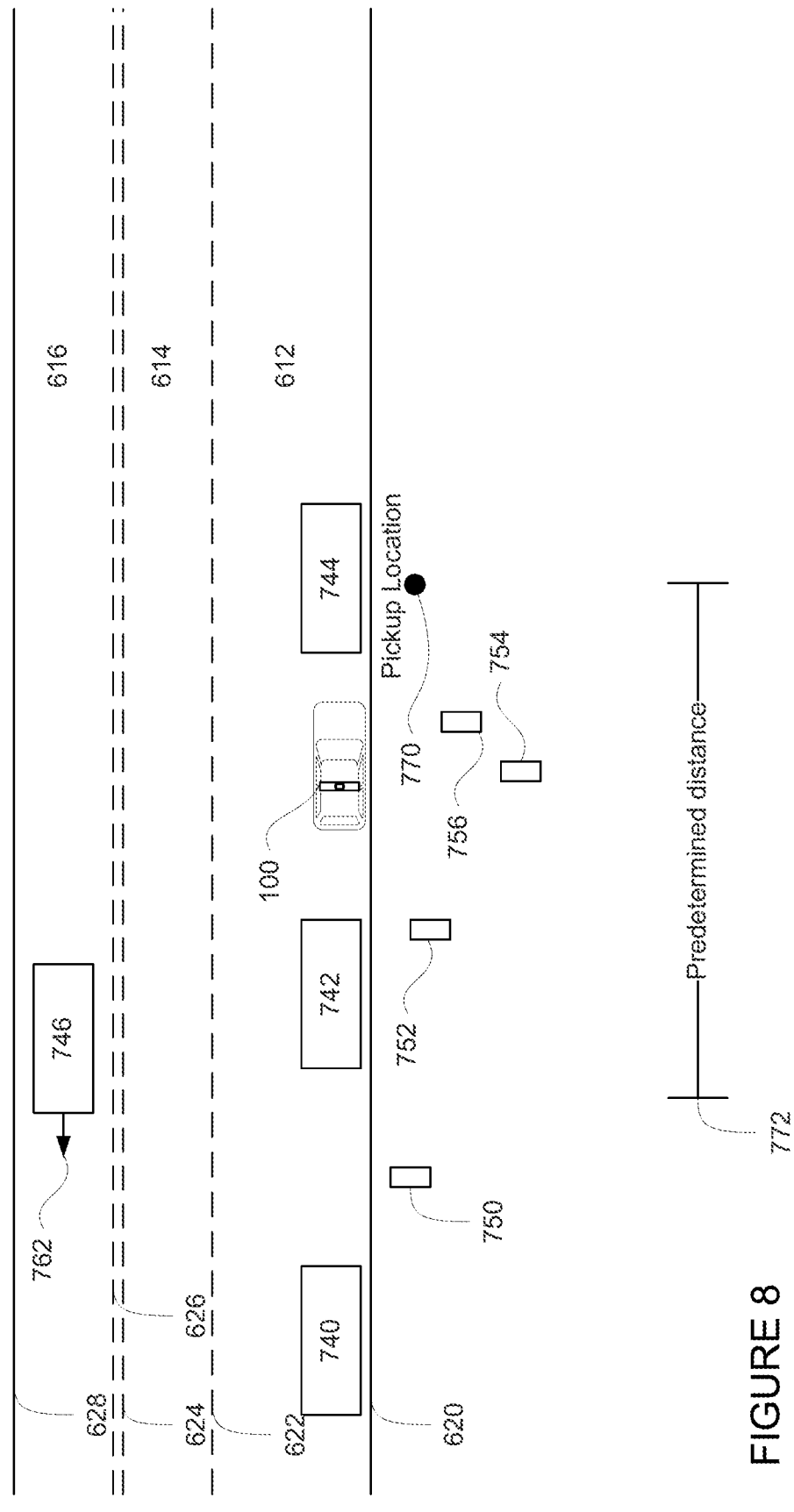
FIG. 8 is another example of sensor data for the section of roadway and other information in accordance with aspects of the disclosure.

At the same time, the computing devices 110 may attempt to stop the vehicle at a location proximate to the pickup location 770 in order to allow the passenger to enter. For instance, the computing devices 110 may identify the area between bounding box 742 and bounding box 744 as an appropriate location (for instance, a parking spot) at which the vehicle may stop and wait for the assigned passenger. In this regard, the computing devices 110 may maneuver the vehicle to the parking spot between bounding boxes 742 and 744, as shown in FIG. 8.

Once the client computing device is authenticated and the vehicle is stopped and waiting, any pedestrian, including those other than the assigned passenger, may be able to enter the vehicle and, of course, become a passenger. For example, as shown in FIG. 8, there are several bounding boxes corresponding to pedestrians including bounding boxes 750, 752, 754, 756 which could possibly be the assigned pedestrian for the vehicle (i.e. the pedestrian associated with client computing device 410). All of these pedestrians may be close enough to the vehicle to create a communication link and authenticate his or her client computing device, but given the close proximity to the vehicle, any of these pedestrians may enter the vehicle. This may be especially likely to occur in situations where there are multiple passengers waiting for such vehicles in the same area (such as a train station, movie theater, airport, mall, etc.).

Once the pedestrian (now passenger) enters the vehicle, he or she may be asked to perform some tasks such as buckle a seat belt, close a door, and/or confirm his or her destination as that of the assigned passenger. For instance, a request to confirm the destination may be displayed on internal electronic display 152. A response may be spoken by the passenger if the vehicle uses a microphone to record audible input and/or entered using the user input 150. Asking the passenger to confirm the destination may be a useful way to determine that the passenger is indeed the assigned passenger. However, in some cases, the passenger may inadvertently or purposefully confirm a destination which is incorrect. Once this confirmation is received, the computing devices 110 may begin to maneuver the vehicle 100 towards the destination.

Thus, the computing devices 110 must be able to determine whether the passenger is the assigned pedestrian beyond authenticating the client computing device of the assigned passenger and/or asking for the passenger to confirm the destination. This may include using facial recognition techniques and/or having a concierge or remote operator check in on the passenger and confirm his or her identity visually (using a camera or other imaging device) or using an audio and/or video connection to communicate with the passenger (e.g., using an internal display, speaker, and microphone).

However, to avoid unnecessary delays, when the passenger is safely situated within the vehicle, for instance with seat belt buckled and doors of the vehicle closed, the computing devices 110 may immediately begin maneuvering the vehicle to the destination (of the assigned passenger). Once the vehicle's computing devices begin maneuvering the vehicle towards the destination of the assigned passenger, the computing devices may use information received from the client computing device of the passenger within the vehicle as well as the assigned passenger to determine whether the assigned passenger is actually within the vehicle.

Figure 9:
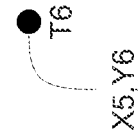
FIG. 9 is example GPS coordinate data in accordance with aspects of the disclosure.
Figure 9:
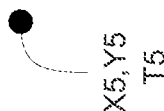
Figure 9:
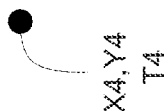
Figure 9:
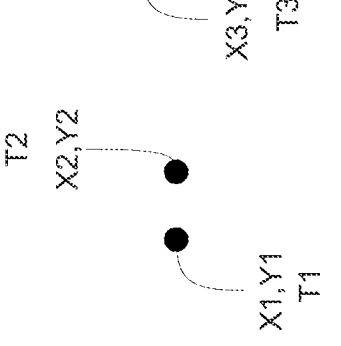

For instance, once the authentication has taken place as noted above (e.g., before the assigned passenger has entered the vehicle), the assigned passenger's client computing device may begin sharing GPS coordinates with the vehicle's computing devices. In addition or alternatively, this information may be sent by the assigned passenger's client computing device to the server computing devices 410 and relayed to the computing devices 110. As shown in FIG. 9, the client computing device 420 may share GPS coordinates X1,Y1 at a time T1 immediately before or when the vehicle begins to move from the stopped position in FIG. 8 towards the destination of the assigned passenger. Thereafter, the client computing device may send updated GPS coordinates at times T2, T3, T4, T5 and so on. In addition, or alternatively, this information may be relayed from the client computing device by the server computing devices to the computing devices 110.

If the communication link between the computing devices 110 and the client computing device continues over time, this may indicate that the client computing device is within and moving with the vehicle. Alternatively, if the assigned passenger is not in the vehicle, eventually the vehicle will move far enough away that the communication link between the computing devices 110 and the client computing device is terminated. However, this may not occur until the vehicle has moved quite a ways away from the client computing device, such as 50 or 100 feet, or more or less. To address this, the computing devices 110 may attempt to reduce the authentication radius (e.g., how far the computing devices 110 send signals or rather the strength of those signals) when the vehicle begins to move as the assigned passenger (and his or her client computing device) may be assumed to be within the vehicle. In addition or alternatively, if there are interior and exterior transceivers for receiving these signals, the computing devices 110 may switch from the exterior to the interior ones once a passenger has entered the vehicle.

Once the vehicle begins moving, the computing devices may confirm that the GPS coordinates of the client computing devices are consistent with the location of the vehicle. This may include simply comparing the location of the vehicle with the GPS coordinates received from the client computing device each time an update is received.

Figure 10:
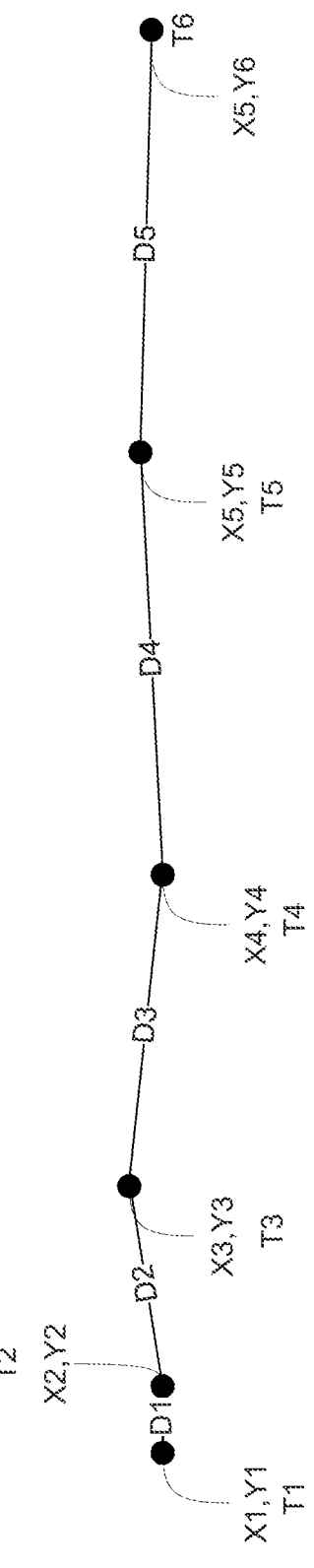
FIG. 10 is example GPS coordinate data in accordance with aspects of the disclosure.

In addition or alternatively, the computing devices 110 may determine whether the change in the GPS coordinates over time is consistent with the movement of the vehicle or the vehicle's route (as determined by the navigation system) over time. This may involve first determining the distances between GPS coordinates of the client computing device each time the computing devices 110 receive updated GPS coordinates. For instance, turning to FIG. 10, the distances D1-D5 between X1,Y1 and X2,Y2, X2,Y2 and X3,Y3, and so on may be determined. Direction or heading may be determined, for instance, from the slope of the lines between each of the GPS coordinates.

Velocity may be estimated by simply dividing the distances by the time between these updates. For example, the velocity V1 between time T1 and T2 would be the distance D1 divided by the difference in time between T1 and T2. Similarly, the velocity V2 between time T2 and T3 would be the distance D2 divided by the difference in time between T2 and T3.

Acceleration may also be determined by determining the change in velocity each time updated GPS coordinates are received. For instance, the acceleration may be determined from the difference between the velocity V1 and the velocity V2 divided by the difference in time between T3 and T2.

The computing devices may determine if the speed, heading, and/or acceleration are consistent by comparing the values determined from the GPS coordinates received from the client computing device to the actual speed, heading, and acceleration of the vehicle. This information may be retrieved from the navigation system and/or directly from the vehicle pose measurements at a GPS receiver and other measurement devices arranged around the vehicle. This measured motion may be compared to the estimated motion of the client computing device. This may then be combined with the measured error or variance of the GPS location for the client computing device and used compute a confidence value that the two motions are aligned. A minimum threshold value may then be used to determine if this likelihood is great enough to indicate that the assigned passenger (or really, the assigned passenger's client computing device) is within the vehicle. For instance, if a vehicle's motion and that of an assigned passenger's client computing device are aligned with a 50% confidence level, and the minimum threshold value is 75%, the computing devices 110 may determine that the assigned passenger is not within the vehicle. Similarly, if a vehicle's motion and that of an assigned passenger's client computing device are aligned at an 80% confidence level, and the minimum threshold value is 75%, the computing devices 110 may determine that the assigned passenger is within the vehicle.

This process may additionally incorporate a model of pedestrian motion. For instance, if the vehicle moved at a speed or acceleration that a pedestrian would have trouble matching, and similar movement was observed in the estimated velocity and/or acceleration, this may indicate a higher likelihood that the assigned pedestrian is in the vehicle. However, in some instances, this could also cause false positives if the assigned passenger is actually running after the vehicle in frustration, or if two passengers switched assigned vehicles accidentally, and both vehicles drove away at roughly the same time and in the same direction. In this regard, it may make sense to continue tracking the assigned passenger's location with respect to the location of the vehicle for some additional period of time or during the entire trip.

Although GPS coordinates determined by the client device may be somewhat inaccurate, looking at the change in this location over time may be a fair approximation of movement of the client computing device.

When the speed, heading, and/or acceleration are consistent, this may confirm that the assigned passenger is in the vehicle. In other words, the computing devices 110 may confirm the identity of the passenger in the vehicle using the comparisons described above and continue to maneuver the vehicle towards the destination of the assigned passenger.

If the speed, heading, and/or acceleration are not consistent, this may indicate that the assigned passenger is not in the vehicle and another passenger has entered the vehicle. At this point, the computing devices 110 may pull the vehicle over and stop to allow the incorrect passenger to exit the vehicle.

However, in order to reduce delays or unsafe situations for the passenger and vehicle, the vehicle's computing devices may continue to maneuver the vehicle towards the destination (rather than stopping) and attempt to determine who is in the vehicle. This may involve attempting to communicate with a client computing device within the vehicle in order to obtain sufficient information to authenticate the client computing device within the vehicle and/or request an updated destination from the dispatching server computing device. This may be achieved by the computing devices 110 sending a request to the server computing devices for assistance. In response, the server computing devices may send a request through the application to any client computing devices with the application within a short distance of the location of the vehicle and currently using the service (i.e., is active). The request may ask those client computing devices to broadcast a signal (such as a BLUETOOTH® signal). This may allow the computing devices 110 to query for such signals in order to identify which client device is currently in the vehicle. Information in the signals, such as an ID for the active client computing device, may then be sent to the server computing devices in a request for authentication information for that client computing device. If more than one signal and ID are identified, all of the IDs may be sent to the server. In response, the server could examine each nearby client computing device's motion, for instance by determining changes in GPS locations over time, and compare that information to the vehicle's motion. The active client computing device with the closest match may be assumed to be the client computing device of the new passenger within the vehicle.

In such cases, the dispatching server computing device may then reassign the vehicle to the new passenger and send authentication information to the vehicle's computing devices. In this regard, once the client computing device within the vehicle is authenticated, the computing devices may identify the passenger's actual destination and change the destination of the previously assigned passenger to that of the newly assigned passenger. The newly assigned passenger may then be notified, for instance on a display of the vehicle and/or on his or her client computing device, of the change in destination and why it has occurred. The newly assigned passenger may even be asked to confirm that the new destination is correct.

Of course, some passengers may attempt to take advantage of this by "jumping into" vehicles they know are assigned to other passengers. To reduce or prevent this, the passenger may be presented with a notification on his or her client device that he or she is in the wrong vehicle.

In addition or alternatively, the computing devices may attempt to communicate with any client computing devices that entered the vehicle with the passenger. This may include using multiple antennas of the vehicle to send a signal to any such devices requesting a response identifying the client computing device. As an example, the antennas may be near range antennas, WiFi antennas, and/or BLUETOOTH sensors. The application of a client computing device within the vehicle may receive the request and generate a response identifying the passenger, the client computing device, or both. If a response is received, the computing devices may confirm whether it came from the client computing device of the assigned passenger or a different passenger.

In addition or alternatively, the computing devices may send a request for the assigned passenger to confirm whether or not he or she is in the vehicle. This may allow the assigned passenger to confirm whether the assigned passenger allowed another passenger to enter the vehicle on purpose. At the same time, the server computing device may assign a new vehicle to the originally assigned passenger. In addition, this passenger may be notified via his or her client computing device that a new vehicle has been dispatched and offer some other compensation for the inconvenience of the delay (such as a discount, coupon, etc. for this or a future ride).

In some instances, a passenger may not have a client computing device when entering the vehicle. For instance, if the vehicle was requested for a third party not familiar with or able to use the application, the passenger's client computing device has lost power (e.g., the battery has died), or if the passenger who is handicapped. In such cases, the passenger may be required to display or otherwise use a badge or enter a pin or other code in order to identify his or herself to the vehicle's computing devices. This information may be generated by the application, the dispatching server computing device, or the person requesting the vehicle for the third party. The person requesting the vehicle can then share the information with the third party or enter it for them in the vehicle.

FIG. 11 is a flow diagram 1100 that may be performed by one or more processors, such as one or more processors 120 of computing device 110 in order to identify a passenger of a vehicle. At block 1102, instructions to pick up an assigned passenger associated with a first client computing device are received from a server computing device. These instructions identify a first destination location. Location information generated by the first client computing device is received over time at block 1104. After a given passenger enters the vehicle, the vehicle is maneuvered towards the first destination location in an autonomous driving mode at block 1106. While maneuvering the vehicle towards the first destination location, a location of the vehicle is compared to the received location information at block 1108. Whether the given passenger is the assigned passenger is determined based on the comparison at block 1110.

FIGS. 12A-12B are a flow diagram 1200 that may be performed by one or more processors such as one or more processors 120 of computing device 110 in order to change a destination of a driverless vehicle as discussed above. In this example, at block 1202, dispatching instructions to pick up a first passenger at a pickup location and to drop off the first passenger at a first destination location are received from a dispatching server. At block 1204, authentication information for authenticating a first client computing device associated with the first passenger is received. At block 1206, the vehicle is maneuvered towards the pickup location in an autonomous driving mode. At block 1208, the first client computing devices is authenticated. Location information from the first client computing device is received over time at block 1210. The vehicle is stopped and a second passenger is allowed to enter the vehicle at block 1212. After the second passenger enters the vehicle and the first client computing device is authenticated, the vehicle is maneuvered towards the first destination location in the autonomous driving mode at block 1214. While maneuvering the vehicle towards the first destination location, a location of the vehicle is compared to the received location information at block 1216. A notification is sent to the dispatching server based on the comparison at block 1218. A second destination location is received at block 1220. The vehicle is then maneuvered towards the second destination instead of the first destination at block 1222.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle, the method comprising:

receiving, by one or more processors of the vehicle, from a dispatching server, instructions to pick up an assigned passenger, the instructions identifying a first destination location for the assigned passenger;

determining, by the one or more processors, that a given passenger who entered the vehicle is not the assigned passenger;

receiving, by the one or more processors, a signal broadcast by a first client computing device in the vehicle that is associated with the given passenger, the signal including information identifying the first client computing device;

in response to determining that the given passenger who entered the vehicle is not the assigned passenger, sending, by the one or more processors, the information identifying the first client computing device to the dispatching server;

receiving, in response to the sending, by the one or more processors, information from the dispatching server indicating that the vehicle has been reassigned to the given passenger;

identifying, by the one or more processors, a second destination location for the given passenger in response to the information from the dispatching server indicating that the vehicle has been reassigned to the given passenger; and maneuvering, by the one or more processors, the vehicle in an autonomous driving mode towards the second destination location instead of the first destination location.

2. The method of claim 1, further comprising:

sending, by the one or more processors, a notification to the dispatching server indicating that the given passenger has been determined not to be the assigned passenger, wherein the notification requests authentication information for the given passenger.

3. The method of claim 2, further comprising:

in response to sending the notification, receiving the authentication information for authenticating the first client computing device; and using the authentication information to authenticate the first client computing device.

4. The method of claim 3, wherein the authentication information is further used for authenticating a second client computing device associated with the assigned passenger.

5. The method of claim 1, further comprising:

sending, by the one or more processors, a request to the dispatching server to initiate the broadcasting of the signal by the first client computing device.

6. The method of claim 1, further comprising:

maneuvering the vehicle towards the first destination location; and while maneuvering the vehicle towards the first destination location, using one or more transceivers of the vehicle to communicate with the first client computing device.

7. The method of claim 1, further comprising:

displaying, by the one or more processors, a request for the given passenger to confirm the second destination location.

8. The method of claim 1, further comprising:

sending, by the one or more processors, a notification to the first client computing device indicating the second destination location.

9. The method of claim 1, further comprising receiving a signal from the first client computing device, the signal including an identifier for the first client computing device.

10. A system for controlling a vehicle, the system comprising one or more processors configured to:

receive, from a dispatching server, instructions to pick up an assigned passenger, the instructions identifying a first destination location for the assigned passenger;

determine that a given passenger who entered the vehicle is not the assigned passenger;

receive a signal broadcast by a first client computing device in the vehicle that is associated with the given passenger, the signal including information identifying the first client computing device;

in response to determining that the given passenger who entered the vehicle is not the assigned passenger, send the information identifying the first client computing device to the dispatching server;

receive, in response to the sending, information from the dispatching server indicating that the vehicle has been reassigned to the given passenger;

identify a second destination location for the given passenger in response to the information from the dispatching server indicating that the vehicle has been reassigned to the given passenger; and maneuver the vehicle in an autonomous driving mode towards the second destination location instead of the first destination location.

11. The system of claim 10, further comprising the vehicle.

12. The system of claim 10, wherein the one or more processors are further configured to:

send a notification to the dispatching server indicating that the given passenger has been determined not to be the assigned passenger, wherein the notification requests authentication information for the given passenger.

13. The system of claim 12, wherein the one or more processors are further configured to:

in response to sending the notification, receive the authentication information for authenticating the first client computing device; and use the authentication information to authenticate the first client computing device.

14. The system of claim 13, wherein the authentication information is further used for authenticating a second client computing device associated with the assigned passenger.

15. The system of claim 10, wherein the one or more processors are further configured to send a request to the dispatching server to initiate the broadcasting of the signal by the first client computing device.

16. The system of claim 10, wherein the one or more processors are further configured to:

maneuver the vehicle towards the first destination location; and while maneuvering the vehicle towards the first destination location, use one or more transceivers of the vehicle to communicate with the first client computing device.

17. The system of claim 10, wherein the one or more processors are further configured to display a request for the given passenger to confirm the second destination location.

18. The system of claim 10, wherein the one or more processors are further configured to send a notification to the first client computing device indicating the second destination location.

19. The system of claim 18, wherein the one or more processors are further configured to receive a signal from the first client computing device, the signal including an identifier for the first client computing device.

20. The system of claim 10, further comprising the dispatching server.

21. A system comprising one or more processors configured to:

cause a vehicle to maneuver in an autonomous driving mode towards a first destination location in order to pick up an assigned passenger by sending dispatching instructions identifying the first destination location for the assigned passenger to the vehicle;

receive, from the vehicle, a first request to initiate communication with a client computing device in the vehicle that is associated with a given passenger who entered the vehicle and who is not the assigned passenger;

send a second request that causes the client computing device to broadcast a signal including information identifying the client computing device;

receive, from the vehicle, the information identifying the client computing device;

in response to receiving the information, assigning the vehicle to the given passenger; and after assigning the vehicle, cause the vehicle to maneuver in the autonomous driving mode towards a second destination location instead of the first destination location.

22. The system of claim 21, wherein the one or more processors are further configured to receive a notification indicating that the given passenger has been determined not to be the assigned passenger.

23. The system of claim 22, wherein the notification requests authentication information for the given passenger.

24. The system of claim 23, wherein the one or more processors are further configured to send the authentication information for authenticating the client computing device in response to the notification.

* * * * *